United States Patent [19]

Mikoshiba

[11] Patent Number: 5,499,123
[45] Date of Patent: Mar. 12, 1996

[54] ACTIVE MATRIX LIQUID CRYSTAL DISPLAY CELL WITH LIGHT BLOCKING CAPACITOR ELECTRODE ABOVE INSULATING LAYER

[75] Inventor: Hiroaki Mikoshiba, Tokyo, Japan

[73] Assignee: NEC Corporation, Tokyo, Japan

[21] Appl. No.: 141,880

[22] Filed: Oct. 27, 1993

[30] Foreign Application Priority Data

Oct. 27, 1992 [JP] Japan .................................. 4-288039

[51] Int. Cl.⁶ ..................... G02F 1/136; G02F 1/1345; G02F 1/1343
[52] U.S. Cl. ...................... 359/59; 359/87; 359/67; 359/54
[58] Field of Search ................. 359/59, 87, 54, 359/67; 257/59

[56] References Cited

U.S. PATENT DOCUMENTS

| | | | |
|---|---|---|---|
| 5,132,820 | 7/1992 | Someya et al. | 359/59 |
| 5,162,933 | 11/1992 | Kakuda et al. | 359/87 |
| 5,177,577 | 1/1993 | Taniguchi et al. | 257/59 |
| 5,305,128 | 4/1994 | Stupp et al. | 359/59 |
| 5,339,181 | 8/1994 | Kim et al. | 359/59 |
| 5,414,547 | 5/1995 | Matsuo et al. | 359/67 |

FOREIGN PATENT DOCUMENTS

| | | | |
|---|---|---|---|
| 0136509 | 4/1985 | European Pat. Off. | |
| 0376437 | 4/1990 | European Pat. Off. | |
| 0434161 | 6/1991 | European Pat. Off. | |
| 0464579 | 1/1992 | European Pat. Off. | |
| 1042635 | 2/1989 | Japan | 359/59 |
| 4051121 | 2/1992 | Japan | 359/87 |
| 5216067 | 8/1993 | Japan | 359/59 |

*Primary Examiner*—William L. Sikes
*Assistant Examiner*—Kenneth Parker
*Attorney, Agent, or Firm*—Sughrue, Mion, Zinn, Macpeak & Seas

[57] ABSTRACT

In an active matrix liquid crystal display cell having a switching active element, first and second transparent electrodes between which liquid crystal is filled, and a shading layer for protecting the switching active element and enhancing a contrast of light, an insulating layer is interposed between the shading layer and the first transparent electrode with the shading layer partially laid under the first transparent electrode through the insulating layer.

14 Claims, 6 Drawing Sheets

ACTIVE MATRIX LIQUID CRYSTAL DISPLAY CELL WITH LIGHT BLOCKING CAPACITOR ELECTRODE ABOVE INSULATING LAYER

BACKGROUND OF THE INVENTION

The present invention relates to an active matrix liquid crystal display cell which serves to provide a single picture element, namely, a pixel, and an active matrix liquid crystal display panel comprising a plurality of the active matrix liquid crystal display cells arranged in a matrix fashion.

In the manner which will later be described more in detail, a conventional active matrix liquid crystal display cell of the type described comprises an active switch element for driving liquid crystal, a capacitance element which stores charge for driving the liquid crystal, a pair of transparent electrodes between which the liquid crystal is filled, and a shading layer for protecting the switching active element and enhancing a contrast of light.

Recently each of the active matrix liquid crystal display cells have become small in size in order to increase the numbers thereof for improving the resolution power of the active matrix liquid crystal display panel.

However, due to a structure of each active matrix liquid crystal display cell, the conventional active matrix liquid crystal display panel cannot provide a bright image when the active matrix liquid crystal display cell becomes small in size for the above-mentioned purpose.

SUMMARY OF THE INVENTION

It is therefore an object of this invention to provide an active matrix liquid crystal display cell and a panel comprising a plurality thereof which can provide a bright image, even though the active matrix liquid crystal display cell becomes small in size.

Other objects of this invention will become clear as the description proceeds.

According to an aspect of this invention, there is provided an active matrix liquid crystal display cell which comprises: an active switching element; first and second transparent electrodes between which the liquid crystal is filled, the first transparent electrode being connected to the switching active element for driving the liquid crystal and the second transparent electrode being positioned opposite to the first transparent electrode; a shading layer which is made of a conductive material; and an insulating layer which is interposed between the shading layer and the first transparent electrode with the shading layer partially laid under the first transparent electrode through the insulating layer. The shading layer may be made of aluminum and the insulating layer may be formed by an anodic oxidation of the aluminum.

According to another aspect of this invention, there is provided an active matrix liquid crystal display panel comprising a plurality of active matrix liquid crystal display cells arranged in a matrix fashion, each of the active matrix liquid crystal display cells comprising: an active switching element; first and second transparent electrodes between which the liquid crystal is filled, the first transparent electrode being connected to the switching active element for driving the liquid crystal and the second transparent electrode being positioned opposite to the first transparent electrode; a shading layer which is made of a conductive material; and an insulating layer which is interposed between the shading layer and the first transparent electrode with the shading layer partially laid under the first transparent electrode through the insulating layer.

DESCRIPTION OF THE PREFERRED EMBODIMENTS

Figure 1:
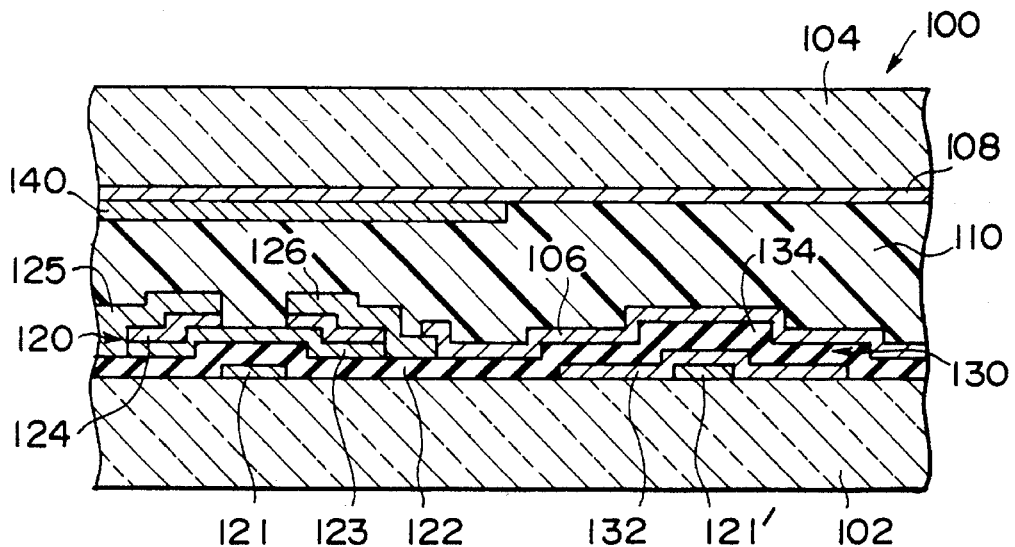
FIG. 1 is a schematic vertical sectional view of a conventional active matrix liquid crystal display cell.

Referring to FIG. 1, a conventional active matrix liquid crystal display cell will first be described for a better understanding of this invention.

In FIG. 1, the conventional active matrix liquid crystal display cell 100 comprises a principal glass substrate 102, an opposite glass substrate 104, a transparent pixel electrode 106 deposited at the side of the principal glass substrate 102, a transparent opposite electrode 108 formed under the whole area of the opposite glass substrate 104, and a liquid crystal 110 filled between the transparent pixel electrode 106 and the transparent opposite electrode 108, an active switching element 120, a capacitance element 130, and a shading layer 140.

The switching active element 120 is formed by a thin-film transistor (TFT) of a bottom gate type, which consists of a gate 121, a gate insulating layer 122, an amorphous silicon layer 123, a doped amorphous silicon layer 124, a drain 125, and a source 126. The gate 121 is connected to a gate bus (not shown) and the drain 125 is connected to a drain or signal bus (not shown), while the source 126 is connected to the transparent pixel electrode 106. The capacitance element 130 consists of the transparent pixel electrode 106, a transparent electrode 132, and a dielectric layer 134 which is defined by a portion of the gate insulating layer 122. The shading layer 140 is partially deposited under the transparent opposite electrode 108.

The liquid crystal 110 is also filled between the switching active element 120 and the shading layer 140, as illustrated in FIG. 1. In the active matrix liquid crystal display cell 100, the transparent pixel electrode 106, the transparent electrode 132 and the transparent opposite electrode 108 are formed from ITO (Indium Tin Oxide) layer.

As mentioned in the preamble of the instant specification, a plurality of the active matrix liquid crystal display cells 100 are arranged in a matrix fashion to form an active matrix liquid crystal display panel (not shown).

In order to increase numbers of the active matrix liquid crystal display cells 100 for getting an excellent resolution power of the active matrix liquid crystal display panel, each active matrix liquid crystal display cell 100 is sometimes decreased in size into 50×50 micron meters.

In such a case, two problems inevitably happens to the conventional active matrix liquid crystal display cell 100.

First, since the shading layer 140 is deposited at the side of the opposite glass substrate 104, the shading layer 140 must be fully expanded to cover the whole area of the switching active element 120 and an edge portion of the transparent pixel electrode 106 in order to completely protect the switching active element 120 from light and to prevent a leak of light around the transparent electrode 132.

However, an allowance of about 10 micron meters is generally required when the opposite glass substrate 104 is positioned to be fitted to the principal glass substrate 102. Further, an overlapping of approximately 5 micron meters is required between the transparent electrode 132 and the shading layer 140. Accordingly, an allowance of about 15 micron meters is required at each side of the active matrix liquid crystal display cell 100, namely, an allowance of 30 micron meters is required at both sides of the active matrix liquid crystal display cell 100. In case of a cell of 50×50 micron meters, an effective pixel portion comes to be 20×20 micron meters. Thus, it was difficult to utilize light efficiency.

Second, the problem lies on that the capacitance element 130 is formed by the transparent pixel electrode 106 and the transparent electrode 132 both of which are made of ITO and between which the dielectric layer 134 is interposed. Since a transmittance of the each ITO layer is about 90%, it comes to be about 80% when light is transmitted through the transparent pixel electrode 106 as well as the transparent opposite electrode 108. Furthermore, since the transparent electrode 132 has a poor conductivity, it is required that the gate 121' be connected to a wiring (not shown) having low resistance. If the width of the gate 121' is 5 micron meters, the above-mentioned effective pixel portion is reduced to be 15×20 micron meters.

Thus, in the conventional active matrix liquid crystal display cell 100, it was difficult to utilize light efficiently, when the cell 100 is made to have a minute size. As a result, an active matrix liquid crystal display panel which comprises a plurality of the cells 100 cannot provide a bright image.

Figure 2:
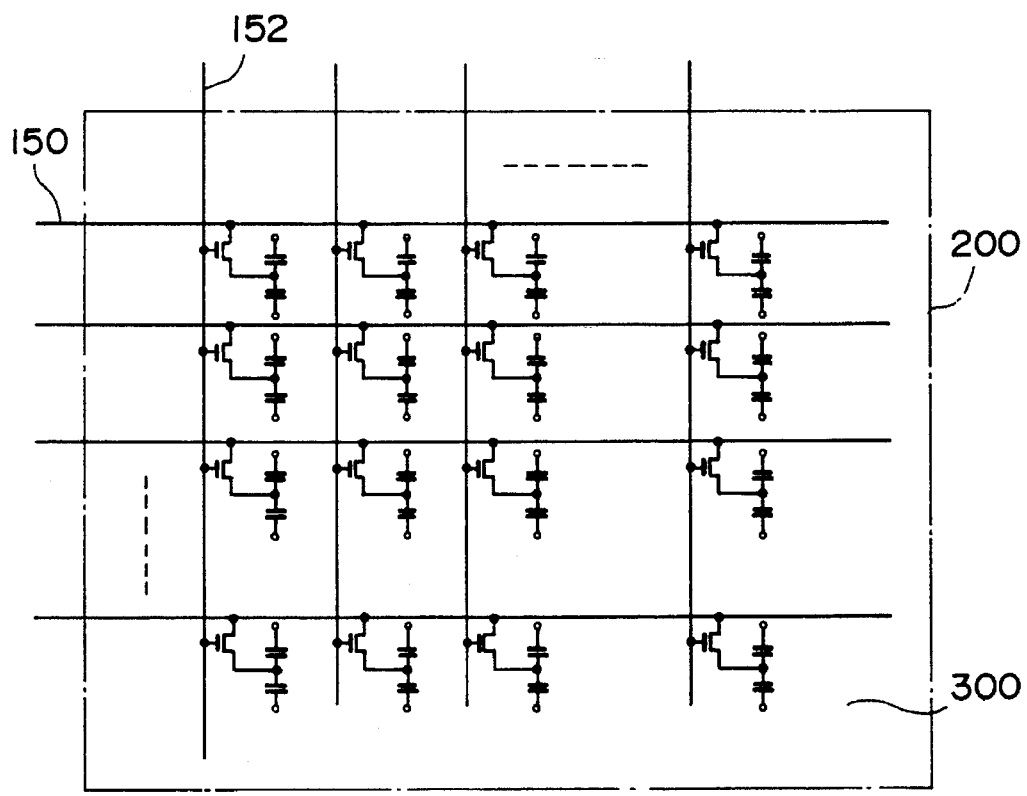
FIG. 2 is a block diagram of an active matrix liquid crystal display panel according to a first embodiment of this invention.
Figure 3A:
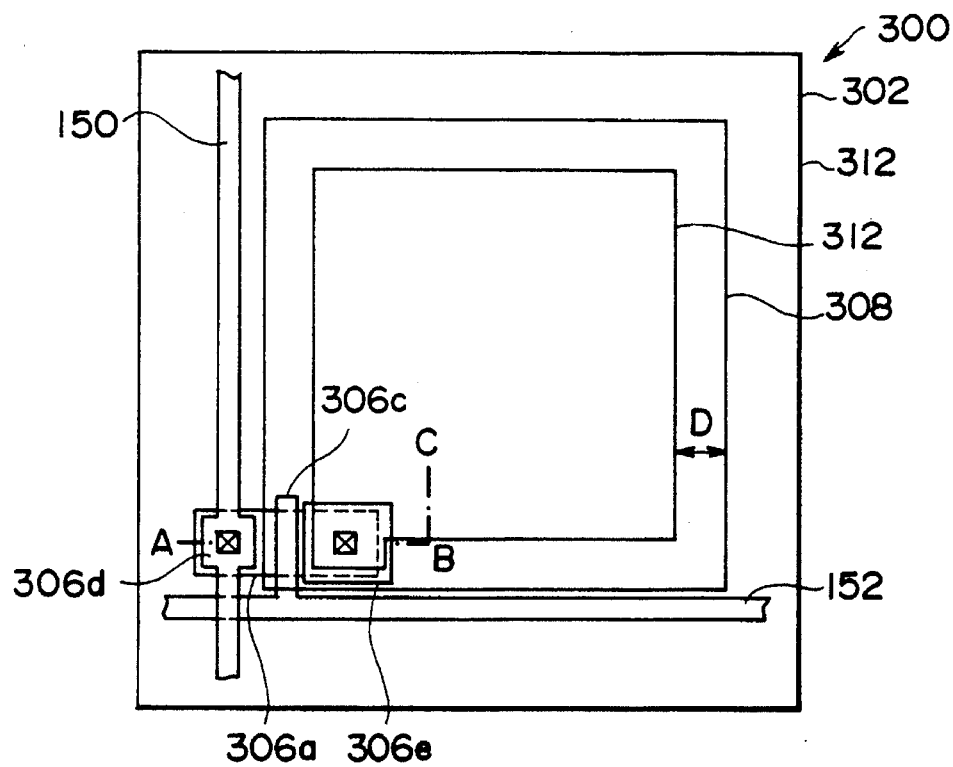
FIG. 3A is a plan view of an active matrix liquid crystal display cell according to a first embodiment of this invention.
Figure 3B:
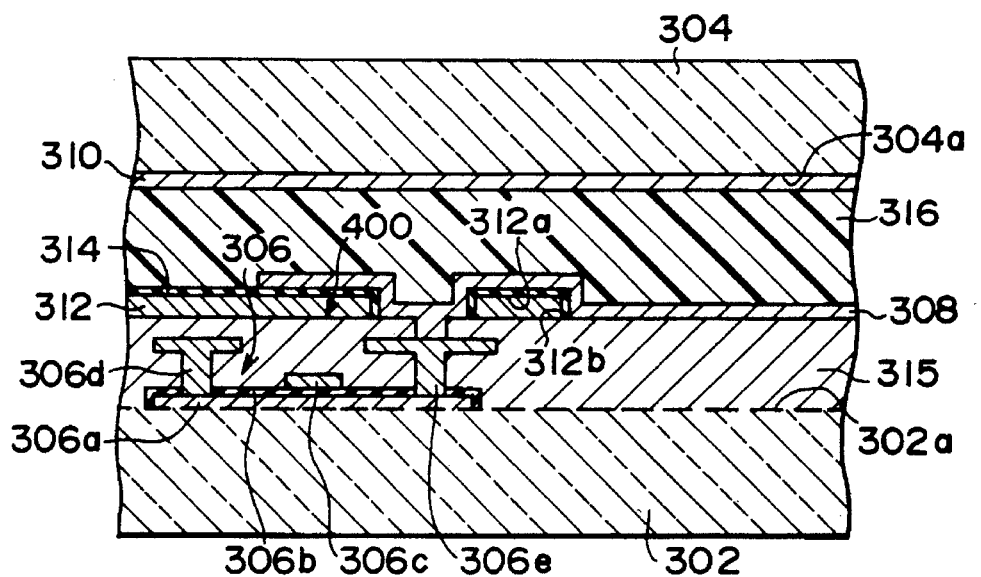
FIG. 3B is a schematic vertical sectional view taken across A-B-C of the active matrix liquid crystal display cell illustrated in FIG. 3A.

Referring now to FIGS. 2, 3A, and 3B, description will proceed to an active matrix liquid crystal display cell and an active matrix liquid crystal display panel comprising a plurality of the active matrix liquid crystal display cells according to a first embodiment of this invention.

In FIG. 2, an active matrix liquid crystal display panel 200 comprises a plurality of active matrix liquid crystal display cells 300 which are arranged in a matrix fashion, signal buses 150, and gate buses 152.

As illustrated in FIGS. 3A and 3B, each of the active matrix liquid crystal display cells 300 comprises a principal transparent glass substrate 302 having a principal surface 302a directed upwards in FIG. 3B, an opposite transparent glass substrate 304 having a lower surface 304a directed downwards in FIG. 3B, a thin-film transistor (TFT) 306 of top-gate type which is formed on the principal surface 302a, a first transparent electrode 308 connected to the TFT 306 for driving liquid crystal, a second transparent electrode 310 which is formed on the lower surface 304a and which is positioned opposite to the first transparent electrode 308, a shading layer 312 which is made of aluminum, and an insulating layer 314 which is formed by an anodic oxidation of aluminum. The shading layer 312 may alternatively be made of the other materials having a low transmittance. The principal transparent glass substrate 302 and the opposite transparent glass substrate 304 are made of quartz glass. The TFT 306 serves as an active switching element, which comprises a polycrystalline silicon layer 306a, a gate insulating layer 306b, a gate 306c, a drain 306d, and a source 306e. The drain 306d is connected to the signal buses 150, while the gate 306c is connected to the gate buses 152.

A liquid crystal 316 is filled between the first transparent electrode 308 and the second transparent electrode 310.

The shading layer 312 has an upper and a side surfaces 312a and 312b. The insulating layer 314 is formed on the upper and the side surfaces 312a and 312b by the above-mentioned anodic oxidation of aluminum. The insulating layer 314 is therefore made of $Al_2O_3$. Preferably, the insulating layer 314 has a thickness between 100 and 200 nm. In order to form the shading layer 312 and the insulating layer 314, at first, an aluminum lamina is deposited in a known manner on a surface of an inter-electrodes insulating layer 315 to be patterned into the shading layer 312 having a predetermined pattern. The shading layer 312 is then anodically oxidized to have the insulating layer 314 of $Al_2O_3$ on its upper and side surfaces 312a and 312b.

Thus, the insulating layer 314 is interposed between the shading layer 312 and the first transparent electrode 308 with the shading layer 312 partially laid under the first transparent electrode 308 through the insulating layer 314.

With this structure, a capacitance element 400 is defined by the shading layer 312, the first transparent electrode 308, and the insulating layer 314 interposed therebetween.

As suggested by a segment D in FIG. 3A, an overlapping area of the shading layer 312 and the first transparent electrode 308 need to have a width between 4 and 8 micron meters.

In the interim, the portion where the source 306e is connected to the first transparent electrode 308 can not be covered by the shading layer 312, as illustrated in FIG. 3B. Accordingly, the source 306e serves as a shading layer at this portion.

Figure 4:
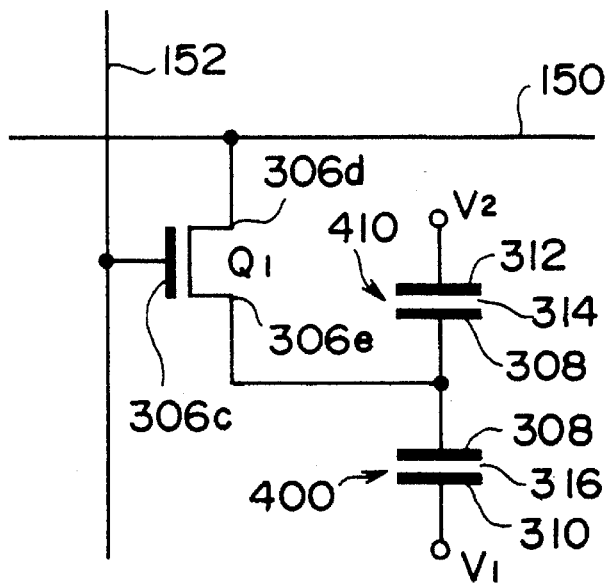
FIG. 4 shows an equivalent circuit of the active matrix liquid crystal display cell illustrated in FIGS. 3A and 3B.

As symbolized in FIG. 4, two capacitance elements 400 and 410 are formed in parallel. One comprises the first transparent electrode 308, the second transparent electrode 310, and the liquid crystal 316 filled therebetween, while another comprises the first transparent electrode 308, the shading layer 312, and the insulating layer 314 interposed therebetween. Bias voltages $V_1$ and $V_2$ are applied to the capacitance elements 400 and 410, respectively.

In this embodiment, since the insulating layer 314 is formed by the anodic oxidation method, there are less defects, such as pin holes or the like, in the insulating layer 314 than that formed by the other method carried out on a lower temperature condition, for example, a plasma CVD, sputtering, or the like. Consequently, the capacitance element 410 having a large dielectric area can be fabricated with a good yield.

Figure 5:
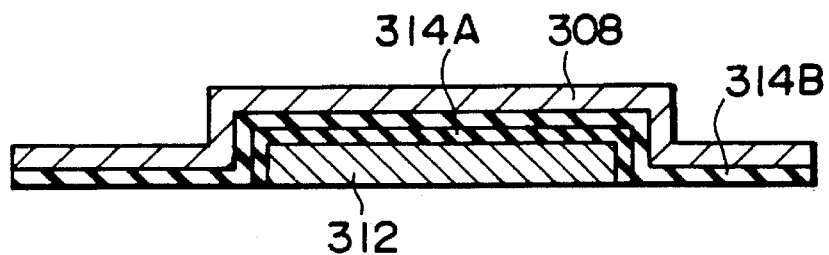
FIG. 5 is a schematic vertical sectional view of a capacitance element of an active matrix liquid crystal display cell according to a second embodiment of this invention.

Referring to FIG. 5, description will proceed to an active matrix liquid crystal display cell according to a second embodiment of this invention.

The active matrix liquid crystal display cell according to the second embodiment has a structure similar to that of the first embodiment except that the insulating layer 314 comprises primary and secondary insulating layers 314A and 314B. The primary insulating layer 314A is formed by the anodic oxidation of the shading layer 312 to be made of $Al_2O_3$, while the secondary insulating layer 314B is formed by another manner, for example, plasma CVD method. In this embodiment, the primary insulating layer 314A of $Al_2O_3$ is formed by the anodic oxidation of the shading layer 312 to have a thickness of 100 nm, while the secondary insulating layer 314B of silicon nitride is formed by plasma CVD method to have a thickness of 100 nm.

In this embodiment, since the insulating layer 314 comprises two stacked layers, namely, primary and secondary insulating layers 314A and 314B, the above-mentioned defects, such as pin holes, in the insulating layer 314 are decreased in number, compared with the above-described first embodiment.

Figure 6:
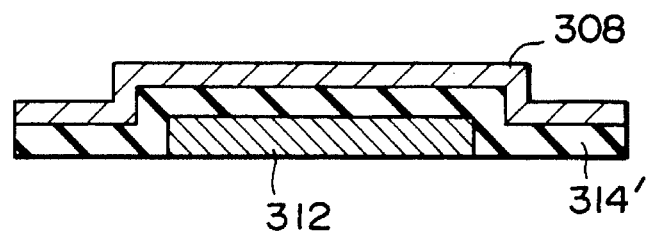
FIG. 6 is a schematic vertical sectional view of a capacitance element of an active matrix liquid crystal display cell according to a third embodiment of this invention.
Figure 7:
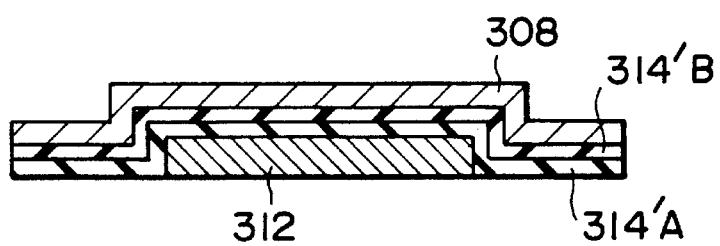
FIG. 7 is a schematic vertical sectional view of a modification of the capacitance element illustrated in FIG. 6.

Referring to FIGS. 6 and 7, description will proceed to active matrix liquid crystal display cells according to a third embodiment of this invention and a modification thereof.

The active matrix liquid crystal display cells according to the third embodiment and the modification thereof have structures similar to that of the first and the second embodiments except that the anodic oxidation method is not used to fabricate those insulating layers.

In FIG. 6, a single insulating layer 314' is formed on the shading layer 312. The insulating layer 314' is made of silicon nitride and formed by a plasma CVD method to have a thickness of, for example, 200 nm.

In FIG. 7, double insulating layers 314'A and 314'B are formed on the shading layer 312. The insulating layer 314'A is made of silicon nitride and formed by a plasma CVD method to have a thickness of, for example, 100 nm. On the other hand, the insulating layer 314'B is made of silicon oxide and formed by a sputtering to have a thickness of, for example, 100 nm.

Figure 8:
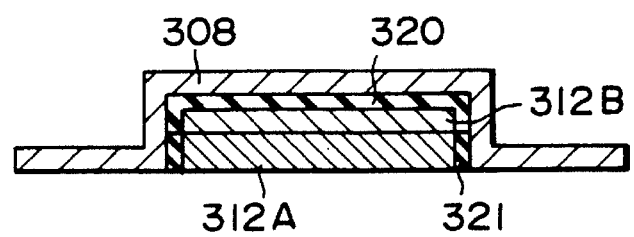
FIG. 8 is a schematic vertical sectional view of a capacitance element of an active matrix liquid crystal display cell according to a fourth embodiment of this invention.

Referring to FIG. 8, description will proceed to an active matrix liquid crystal display cell according to a fourth embodiment of this invention.

The active matrix liquid crystal display cell according to the fourth embodiment has a structure similar to that of the first embodiment except that the shading layer 312 comprises double layers, one of which is a shading layer 312A of aluminum and another of which is a shading layer 312B of tantalum overlaid on the shading layer 312A.

The shading layer 312B of tantalum is readily oxidized by the anodic oxidation to have an insulating layer 320 of $Ta_2O_5$ which has a high dielectrication. Accordingly, another insulating layer 321 of aluminum is formed on the side surfaces of the shading layer 312A.

In this embodiment, it becomes possible that the storage capacitance constant is extremely improved, compared with the above-mentioned first, second, and third embodiments. In this example, the insulating layer 321 of aluminum is used to enhance a shading effect.

Figure 9A:
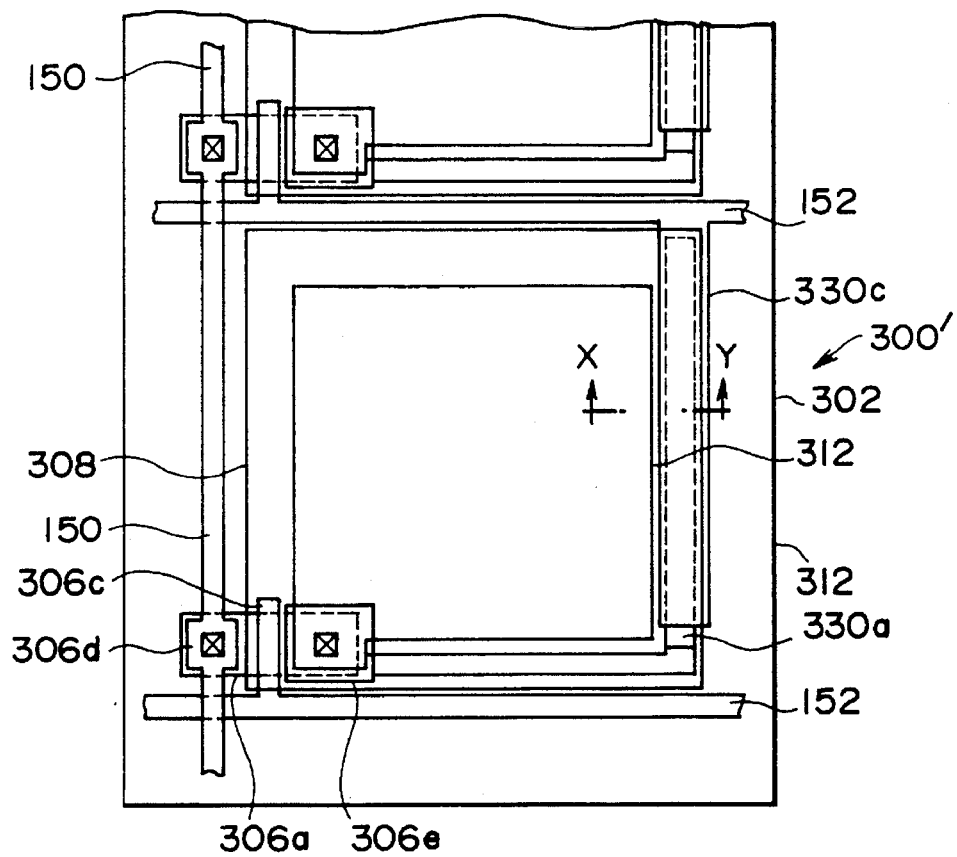
FIG. 9A is a plan view of an active matrix liquid crystal display cell according to a fifth embodiment of this invention.
Figure 9B:
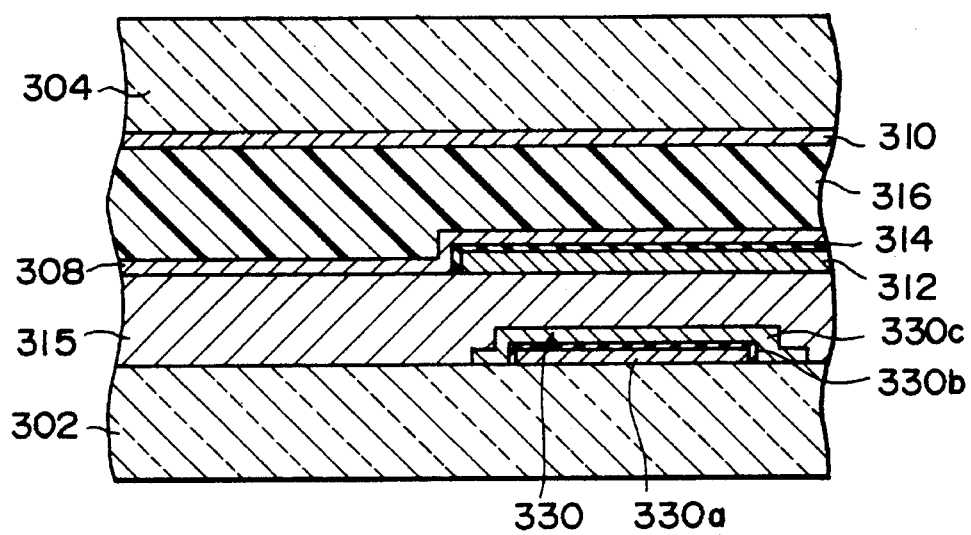
FIG. 9B is a schematic vertical sectional view taken across X-Y of the active matrix liquid crystal display cell illustrated in FIG. 9A.

Referring to FIGS. 9A and 9B, description will proceed to an active matrix liquid crystal display cell according to a fifth embodiment of this invention.

The active matrix liquid crystal display cell according to the fifth embodiment has a structure similar to that of the first embodiment except that the active matrix liquid crystal display cell further comprises an additional capacitance element.

As illustrated in FIGS. 9A and 9B, the active matrix liquid crystal display cell 300' according to the fifth embodiment further comprises the additional capacitance element 330 which is positioned under the overlapping section of the first transparent electrode 308 and the shading layer 312 through an insulating layer 314. The additional capacitance element 330 is defined by a polycrystalline silicon layer 330a, a gate insulating layer 330b, and a gate 330c. The gate 330c is electrically connected to the gate buses 152. The polycrystalline silicon layer 330a is connected to the polycrystalline silicon layer 306a.

In order to fabricate the polycrystalline silicon layer 330a, a polycrystalline silicon lamina is, at first, formed on the principal transparent glass substrate 302. The polycrystalline silicon lamina is then patterned to a predetermined shape to form a patterned polycrystalline silicon layer. Second, the gate insulating layer 330b is deposited on the patterned polycrystalline silicon layer. Thereafter, a section of the patterned polycrystalline silicon layer overlaid by the gate 330c is doped by an ion implantation method to form the polycrystalline silicon layer 330a.

In this embodiment, the additional capacitance element 330 is positioned under the overlapping section of the first transparent electrode 308 and the shading layer 312 through which light cannot pass originally. Accordingly, the additional capacitance element 330 makes it possible that the storage capacitance constant is drastically improved without deteriorating the efficent use of light.

Figure 10:
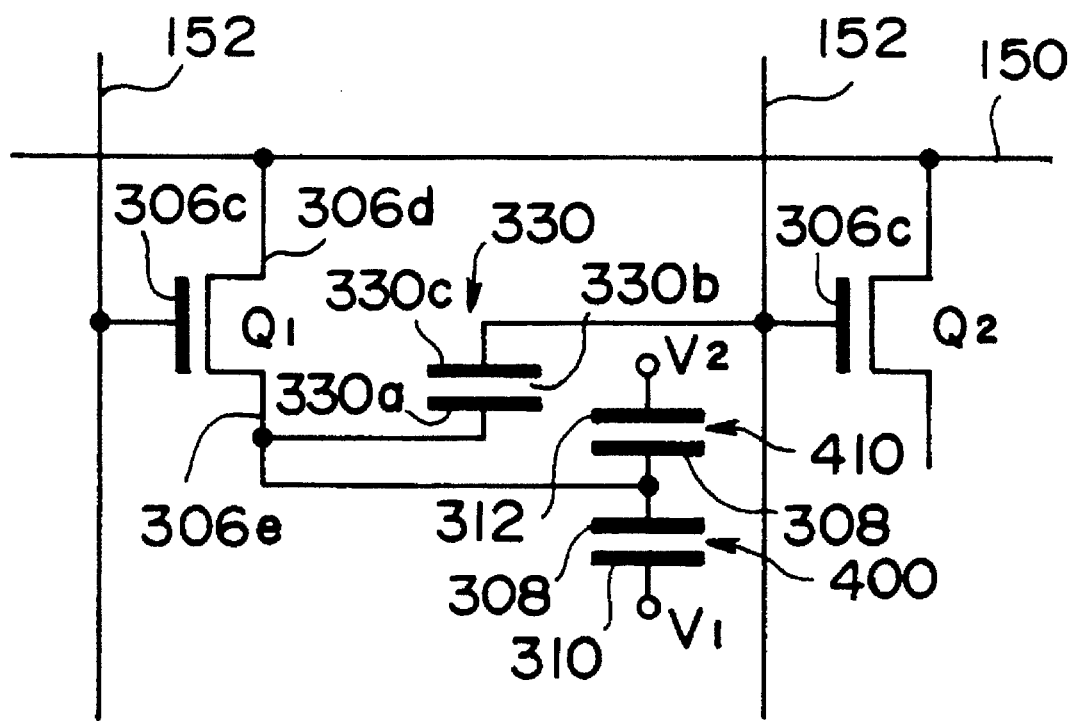
FIG. 10 shows an equivalent circuit of the active matrix liquid display cell illustrated in FIGS. 9A and 9B.

As symbolized in FIG. 10, the additional capacitance element 330 is also formed in parallel to the two capacitance elements 400 and 410 which were mentioned in the discussion of the first embodiment, as symbolized in FIG. 4. The additional capacitance element 330 is connected between the source 306e of a transistor $Q_1$ and the gate 306c of a transistor $Q_2$ as symbolized in FIG. 10.

In the meantime, a TFT generally cannot avoid a leakage current between 0.1 pA and 1.0 pA. It is therefore desired that the constant of the storage capacitance be large enough to store a signal voltage without reduction while the active matrix liquid crystal display cell is scanned.

When the active matrix liquid crystal display cell having such a TFT becomes small, in other words, is decreased in size to, for example, 50×50 micron meters, the constant of the storage capacitance of the two capacitance elements 400 and 410 is 100 pF, at the most. The constant of 100 pF is not enough to store the signal voltage, as mentioned above, in view of the aforesaid leakage current of the TFT. Accordingly, it is very advantageous that the active matrix liquid crystal display cell 300' according to this embodiment comprises the additional capacitance element 330.

While this invention has thus far been described in conjunction with only several embodiments thereof, it will readily be possible for those skilled in the art to put this invention into practice in various other manners.

What is claimed is:

1. An active matrix liquid crystal display cell, comprising:
   a principal transparent glass substrate having a principal surface;

an opposite transparent glass substrate having an opposite surface opposite to said principal surface with a space therebetween;

an active switching element formed on said principal surface, said active switching element having a plurality of electrodes;

an inter-electrode insulating layer formed on said principal surface for insulating said plurality of electrodes from each other;

a shading layer made of a conductive material and formed on said inter-electrode insulating layer;

a first transparent electrode formed on said inter-electrode insulation layer, said first transparent electrode having an overlapping portion overlapping a part of said shading layer and being connected to one of said plurality of electrodes;

an insulating layer interposed between said shading layer and said overlapping portion, wherein a capacitance element is defined by said shading layer, said overlapping portion, and said insulating layer interposed therebetween;

a second transparent electrode formed on said opposite surface positioned opposite to said first transparent electrode; and a liquid crystal disposed between said first transparent electrode and said second transparent electrode, wherein said active switching element is a thin-film, top-gate transistor and said plurality of electrodes are a gate, a drain, and a source, said thin-film transistor further comprising:

a polycrystalline silicon layer formed on said principal surface to which said drain and said source are connected; and a gate insulating layer overlaid on said polycrystalline silicon layer on which said gate is formed, whereby said gate is insulated from said polycrystalline silicon layer.

2. An active matrix liquid crystal display cell as claimed in claim 1, wherein said gate and said polycrystalline silicon layer are capacitively coupled to each other.

3. An active matrix liquid crystal display cell as claimed in claim 1, wherein said shading layer is made of aluminum and said insulating layer is formed by an anodic oxidation of said aluminum.

4. An active matrix liquid crystal display cell as claimed in claim 1, wherein said shading layer comprises tantalum and said insulating layer comprises a layer formed by an anodic oxidation of said tantalum.

5. An active matrix liquid crystal display cell as claimed in claim 1, wherein said insulating layer comprises at least two stacked layers.

6. An active matrix liquid crystal display cell as claimed in claim 5, wherein at least one of said stacked layers is formed by an anodic oxidation of said shading layer.

7. An active matrix liquid crystal display cell, comprising:

a principal transparent glass substrate having a principal surface;

an opposite transparent glass substrate having an opposite surface opposite to said principal surface with a space therebetween;

an active switching element formed on said principal surface, said active switching element having a plurality of electrodes;

an inter-electrode insulating layer formed on said principal surface for insulating said plurality of electrodes from each other;

a shading layer made of a conductive material and formed on said inter-electrode insulating layer;

a first transparent electrode formed on said inter-electrode insulation layer, said first transparent electrode having an overlapping portion overlapping a part of said shading layer and being connected to one of said plurality of electrodes;

an insulating layer interposed between said shading layer and said overlapping portion, wherein a capacitance element is defined by said shading layer, said overlapping portion, and said insulating layer interposed therebetween;

a second transparent electrode formed on said opposite surface positioned opposite to said first transparent electrode; and a liquid crystal disposed between said first transparent electrode and said second transparent electrode, wherein said shading layer is made up of aluminum and said insulating layer is formed by an anodic oxidation of said aluminum.

8. An active matrix liquid crystal display cell, comprising:

a principal transparent glass substrate having a principal surface;

an opposite transparent glass substrate having an opposite surface opposite to said principal surface with a space therebetween;

an active switching element formed on said principal surface, said active switching element having a plurality of electrodes;

an inter-electrode insulating layer formed on said principal surface for insulating said plurality of electrodes from each other;

a shading layer made of a conductive material and formed on said inter-electrode insulating layer;

a first transparent electrode formed on said inter-electrode insulation layer, said first transparent electrode having an overlapping portion overlapping a part of said shading layer and being connected to one of said plurality of electrodes;

an insulating layer interposed between said shading layer and said overlapping portion, wherein a capacitance element is defined by said shading layer, said overlapping portion, and said insulating layer interposed therebetween;

a second transparent electrode formed on said opposite surface positioned opposite to said first transparent electrode; and a liquid crystal disposed between said first transparent electrode and said second transparent electrode, wherein said shading layer comprises tantalum and said insulating layer comprises a layer formed by an anodic oxidation of said tantalum.

9. An active matrix liquid crystal display cell, comprising:

a principal transparent glass substrate having a principal surface;

an opposite transparent glass substrate having an opposite surface opposite to said principal surface with a space therebetween;

an active switching element formed on said principal surface, said active switching element having a plurality of electrodes;

an inter-electrode insulating layer formed on said principal surface for insulating said plurality of electrodes from each other;

a shading layer made of a conductive material and formed on said inter-electrode insulating layer;

a first transparent electrode formed on said inter-electrode insulation layer, said first transparent electrode having an overlapping portion overlapping a part of said shading layer and being connected to one of said plurality of electrodes;

an insulating layer interposed between said shading layer and said overlapping portion, wherein a capacitance element is defined by said shading layer, said overlapping portion, and said insulating layer interposed therebetween;

a second transparent electrode formed on said opposite surface positioned opposite to said first transparent electrode; and a liquid crystal disposed between said first transparent electrode and said second transparent electrode, wherein said insulating layer comprises at least two stacked layers.

10. An active matrix liquid crystal display cell as claimed in claim 9, wherein at least one of said stacked layers is formed by an anodic oxidation of said shading layer.

11. An active matrix liquid crystal display cell, comprising:

an active switching element having a plurality of electrodes, said active switching element being located in a first layer in said active matrix liquid crystal display cell;

a shading layer made of a conductive material;

first and second transparent electrodes between which said liquid crystal is disposed, said first transparent electrode being connected to said active switching element for driving said liquid crystal and having an overlapping portion overlapping a part of said shading layer, said second transparent electrode being positioned opposite to said first transparent electrode; and an insulating layer interposed between said shading layer and said overlapping portion, wherein a capacitance element is defined by said shading layer, said overlapping portion, and said insulating layer interposed therebetween; and said shading layer and said overlapping portion are located in a second layer in said active matrix liquid crystal display cell different from said first layer.

12. An active matrix liquid crystal display cell as claimed in claim 11, wherein said active switching element is a thin-film, top-gate transistor and said plurality of electrodes are a gate, a drain, and a source, said thin-film transistor further comprising:

a polycrystalline silicon layer to which said drain and said source are connected; and a gate insulating layer overlaid on said polycrystalline silicon layer on which said gate is formed, whereby said gate is insulated from said polycrystalline silicon layer.

13. An active matrix liquid crystal display cell as claimed in claim 12, wherein said gate and said polycrystalline silicon layer are capacitively coupled to each other.

14. An active matrix liquid crystal display panel comprising a plurality of active matrix liquid crystal display cells arranged in a matrix fashion, each of said active matrix liquid crystal display cells comprising:

an active switching element having a plurality of electrodes, said active switching element being located in a first layer in said active matrix liquid crystal display cell;

a shading layer made of a conductive material;

first and second transparent electrodes between which said liquid crystal is disposed, said first transparent electrode being connected to said active switching element for driving said liquid crystal and having an overlapping portion overlapping a part of said shading layer, said second transparent electrode being positioned opposite to said first transparent electrode; and an insulating layer interposed between said shading layer and said overlapping portion, wherein a capacitance element is defined by said shading layer, said overlapping portion, and said insulating layer interposed therebetween; and said shading layer and said overlapping portion are located in a second layer in said active matrix liquid crystal display cell different from said first layer.

* * * * *